W. BELL.
DRIVING GEARING.
APPLICATION FILED AUG. 3, 1910.
987,539.
Patented Mar. 21, 1911.
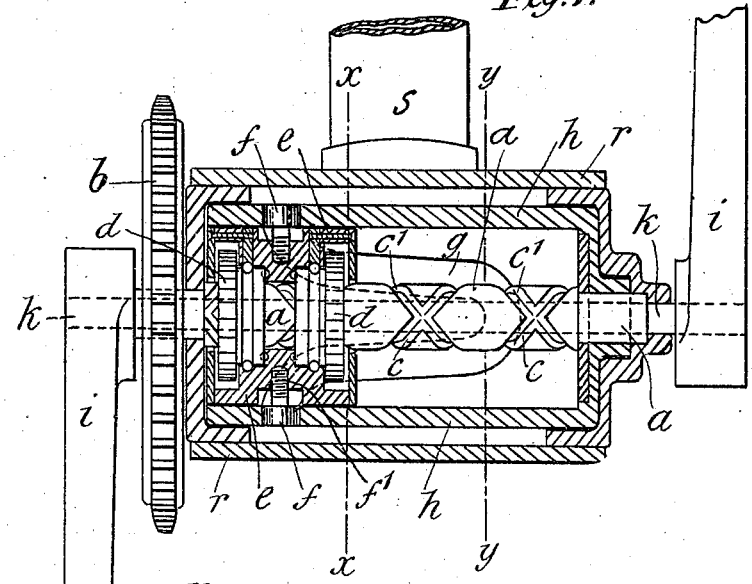
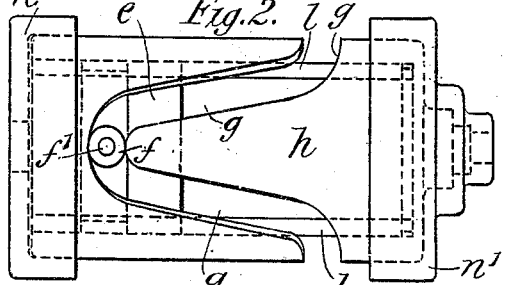
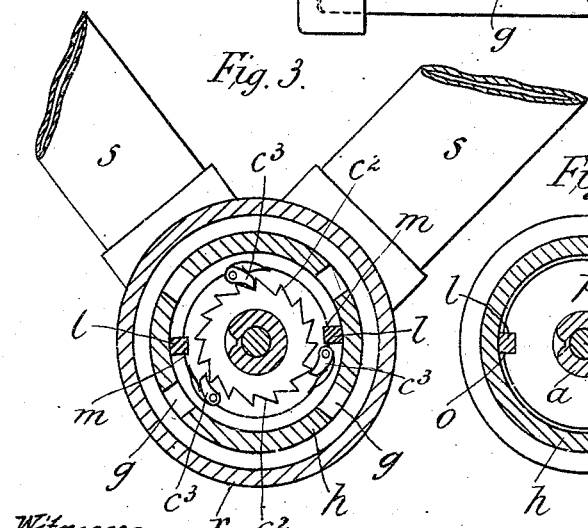
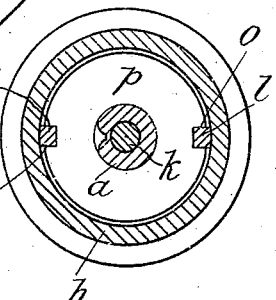
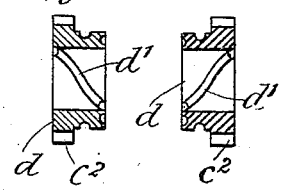
Witnesses
F. M. Mellor
J. J. Rowley
Inventor
William Bell
per J. B. Fleuret
Attorney

UNITED STATES PATENT OFFICE.

WILLIAM BELL, OF PLASHETTS, NORTH TYNE, ENGLAND.

DRIVING-GEARING.

987,539.

Specification of Letters Patent. Patented Mar. 21, 1911.

Application filed August 3, 1910. Serial No. 575,210.

*To all whom it may concern:*

Be it known that I, WILLIAM BELL, coal-miner, a subject of the King of Great Britain and Ireland, and residing at Far Colliery, Plashetts, North Tyne, in the county of Northumberland, England, have invented certain new and useful Improvements in Driving-Gearing for Bicycles and other Road-Vehicles, of which the following is a specification.

This invention relates to improvements in driving gear especially suitable for bicycles and like machines. The said gear consists in forming the driving shaft with right and left hand screw threads, either crossing each other or not as desired, and which gear with two ratchet wheels by means of screw threads in the bosses of the latter, the said wheels being formed with reversely arranged teeth, permitting free-wheel action, and being capable of sliding backward and forward upon the shaft.

These wheels engage with spring pawls carried by a drum or sleeve within which they work, the drum being fitted with opposite pins mounted with rollers which engage with a curved cam path or slot cut in an outer sleeve within which the drum travels backward and forward as a piston, the slot being formed with a double or return curve for causing the drum to perform two double strokes along the shaft at each revolution of the sleeve. Two side stays engage with grooves in the drum for holding it in position and preventing its rotation while permitting of its traveling motion along the shaft. These stays are supported at one end by a fixed cap or cover and at the other end are held in notches formed in a metal ring or washer loosely carried in the said end of the sleeve, each end of the latter revolving within fixed caps or covers which support the driving shaft.

The sleeve is inclosed in a hub or tube to which the tubes of the frame are fixed, each end of the hub being fixed to the end caps or covers. The screw-threaded shaft is hollow and a spindle passes through the same, the driving cranks and the slotted sleeve being fixed to the spindle and the driving wheel or sprocket to the shaft. As the sleeve is turned, by the operation of the cranks, the drum or piston carrying the toothed wheels, is caused to travel backward and forward along the shaft, thus turning the latter and the driving wheel by the thread inside the said wheels engaging with the thread in the shaft. The gear may also be applied for driving propellers and other revolving shafts. And in order to clearly understand my invention reference is made to the accompanying sheet of drawings in which—

Figure 1 is a longitudinal section of the driving shaft bracket or hub of the machine with the improved driving mechanism fitted thereto and Fig. 2 is a plan of the same omitting the hub or frame and cranks. Fig. 3 is a cross section on the line $x, x$, of Fig. 1 looking toward the left of the same, and Fig. 4 is a cross section on the line $y, y$, looking toward the right and omitting the hub. Fig. 5 is a cross section of one of the toothed ratchet wheels carried by the drum and Fig. 6 is a cross section of the other ratchet wheel.

$a$ is the driving shaft and $b$ the driving sprocket wheel fixed thereto.

$c, c'$ are the right and left-hand screw-threads cut in the shaft and as shown crossing each other, or the two threads may be arranged separately in line with each other along the shaft.

$d, d$ are the two ratchet wheels formed in their bosses with a portion $d'$ of a screw thread for engaging with the threads $c, c'$ of the shaft $a$, the teeth $c^2$ of the same being reversely arranged and engaging with spring pawls $c^3$ carried by the drum or sleeve $e$ in which the said wheels are held. A full thread may be formed in the ratchet wheels $d$ if desired and three spring pawls are preferably fitted to engage with the said wheels. The drum is fitted with the small rollers $f$, mounted on opposite pins $f'$, and engaging with or traveling along the cam path or slot $g$ cut in the outer sleeve $h$ within which the drum $e$ travels backward and forward, upon the sleeve $h$ being revolved by the action of the cranks $i$. The slot $g$ is formed with a double or return curve so as to produce a double backward and forward stroke or travel of the drum $e$ along the shaft $a$ thus turning the latter, and the driving wheel $b$, at four times the rate of speed of the sleeve $h$.

$k$ is the central spindle passing through the hollow shaft $a$ and having fixed to its ends the driving cranks $i$ and at one end the outer sleeve $h$.

$l, l$ are the side stays which engage with grooves $m$ formed in each side of the drum $e$ for guiding the same and preventing its turning with the shaft $a$. $n$ is the fixed cap or cover to which one end of the said stays is screwed or otherwise fixed, the other end of the stays being supported in notches $o$ formed in the metal ring or washer $p$ fitted in the other end of the sleeve $h$ which rotates in the cap or cover $n'$ of the hub or tube $r$. The caps or covers are fixed to the latter, and the tubes $s$, forming the frame of the machine, are also fixed to or formed with the said hub or tube $r$.

In operation the crank spindle $k$ turns the outer sleeve $h$. The revolution of the latter causes the drum $e$ to travel backward and forward along the shaft $a$ by means of the slot or cam path $g$ acting upon the rollers $f$ carried by the said drum, the latter being prevented from turning with said shaft by means of the fixed stays $l$ engaging therewith. The travel of the drum $e$ operates the driving shaft $a$ by means of the threads $d'$, in the bosses of the ratchet wheels $d$, engaging with the screw-threads $c$, $c'$ cut in the shaft $a$, the latter turning the driving wheel $b$, fixed thereto, for driving the machine by the ordinary chain or other gearing. The teeth of the ratchet wheels $d$ being formed in reverse directions permit the machine to run with a free wheel when the said wheels are engaged with either the right or left-hand screw-threads $c$ and $c'$ of the shaft $a$. The wheels $d$ are held within the drum $e$ by any suitable means, such as a ring or washer, fixed to each end of the drum, or by ball bearings as shown.

It is evident that the proportional rates of speed between the crank spindle $k$ and the driving shaft $a$ may be varied according to the pitch of the threads on the latter and the travel of the drum $e$ along the same.

Having now fully described the nature of my said invention, what I claim and desire to secure by Letters Patent is—

1. The combination with a spindle bearing driving cranks on its ends, of a sleeve secured to the spindle and having a cam track formed therein, a shaft within the sleeve having an endless spiral track formed thereon, a drum having ribs engaged on said spiral track and loosely mounted on the shaft, and means projecting from the drum into the cam track in the sleeve, the rotation of the sleeve through said track causing the drum to move up and down in the track of the shaft and thus to revolve the shaft.

2. The combination with a sleeve, of means for rotating the same, a drum mounted within the sleeve and slidable longitudinally thereof, guides for preventing the rotation of said drum, a shaft passing through the drum and provided with an endless spiral track, lugs formed on the drum and engaged in said track, and means on the sleeve for reciprocally moving the drum, the engagement of the lugs of the drum in the track of the shaft serving to rotate the latter.

3. The combination with a housing, of a sleeve mounted therein, means for rotating the sleeve, guides secured to the housing and passing through the sleeve, a drum slidably mounted on said guides, a cam track formed in the sleeve, the drum having projections engaged in said track, a shaft passing through the drum and provided with an endless spiral track, a collar mounted on the shaft and having ribs engaged in the track, and pawls for operatively connecting the collar with the drum, the revolution of the sleeve serving to reciprocally move the drum through the medium of the cam track, and said movement through the medium of the spiral track causing the revolution of the shaft.

4. An improved driving gearing, comprising a shaft having an endless spiral track formed therein, a member mounted on the shaft and having ribs engaged in the track, and a rotatable cam in engagement therewith for reciprocally moving said member.

5. The improved driving gearing, comprising a shaft having crossing right and left threads meeting in a common curve at each end of the threaded portion, a non-rotatable reciprocably movable member mounted on the shaft and engaging the threads in one direction, and a rotatable sleeve having a cam track in which said member is engaged, the rotation of the sleeve reciprocally moving the member, the engaging portion of the member passing from one set of the threads to the other at each end and thus causing the shaft to rotate in a constant direction.

In witness whereof I have hereunto set my hand in the presence of two witnesses.

WILLIAM BELL.

Witnesses:
FENWICK HEDLEY RUTHERFORD,
JOHN JOSEPH OLIVER.

---

Copies of this patent may be obtained for five cents each, by addressing the "Commissioner of Patents, Washington, D. C."